US008758853B2

United States Patent
van Ommen et al.

(10) Patent No.: US 8,758,853 B2
(45) Date of Patent: Jun. 24, 2014

(54) PROCESS AND APPARATUS FOR PRODUCING COATED PARTICLES

(75) Inventors: Jan Rudolf van Ommen, Zwijndrecht (NL); Naoko Ellis, Vancouver (CA); Caner Yurteri, Delft (NL); Johannes Cornelis Maria Marijnissen, Breda (NL)

(73) Assignee: Technische Universiteit Delft, Delft (NL)

( * ) Notice: Subject to any disclaimer, the term of this patent is extended or adjusted under 35 U.S.C. 154(b) by 287 days.

(21) Appl. No.: 13/259,003

(22) PCT Filed: Mar. 25, 2010

(86) PCT No.: PCT/NL2010/050155
§ 371 (c)(1),
(2), (4) Date: Dec. 13, 2011

(87) PCT Pub. No.: WO2010/110664
PCT Pub. Date: Sep. 30, 2010

(65) Prior Publication Data
US 2012/0128889 A1 May 24, 2012

(30) Foreign Application Priority Data
Mar. 25, 2009 (NL) .................................. 2002666

(51) Int. Cl.
*B01J 2/16* (2006.01)
*B22F 1/02* (2006.01)
*B82Y 30/00* (2011.01)

(52) U.S. Cl.
USPC ........... 427/212; 427/459; 427/213; 427/215; 427/216; 428/402; 428/403

(58) Field of Classification Search
CPC ........... B01J 2/006; B01J 2/16; B05C 19/025; C01P 2006/12; B22F 1/02; B82Y 30/00
USPC .............. 427/459, 460, 475, 213, 428, 427.1, 427/421.1, 212, 215, 216; 118/621; 428/402, 403
See application file for complete search history.

(56) References Cited

FOREIGN PATENT DOCUMENTS

CN 2011-89461 Y 2/2009
DE 10306887 A1 8/2004
(Continued)

OTHER PUBLICATIONS

Mazumder et al., "Twenty-first Century Research Needs in Electrostatic Processes Applied to Industry and Medicine", Department of Applied Science ETAS 575, University of Arkansas at Little Rock, Chemilcal Engineering Science, 2006, pp. 2192-2211.*

(Continued)

*Primary Examiner* — Frederick Parker
*Assistant Examiner* — Ann DiSarro
(74) *Attorney, Agent, or Firm* — Gilberto M. Villacorta; Tianran Yan; Foley & Lardner LLP

(57) ABSTRACT

The invention is directed to a process and apparatus for preparing coated particles, in particular a process for preparing particles that are coated with small particles using electrospraying. The coated particles produced according to the present invention find use for instance as catalysts or as pharmaceuticals. According to the invention a host particle is contacted in a gas stream where it is allowed to contact with one or more moving tribocharging particles, thus providing a charged host particle, which is subsequently contacted with charged guest particles in an electrospraying step.

7 Claims, 2 Drawing Sheets

(56) References Cited

FOREIGN PATENT DOCUMENTS

Figure 1:
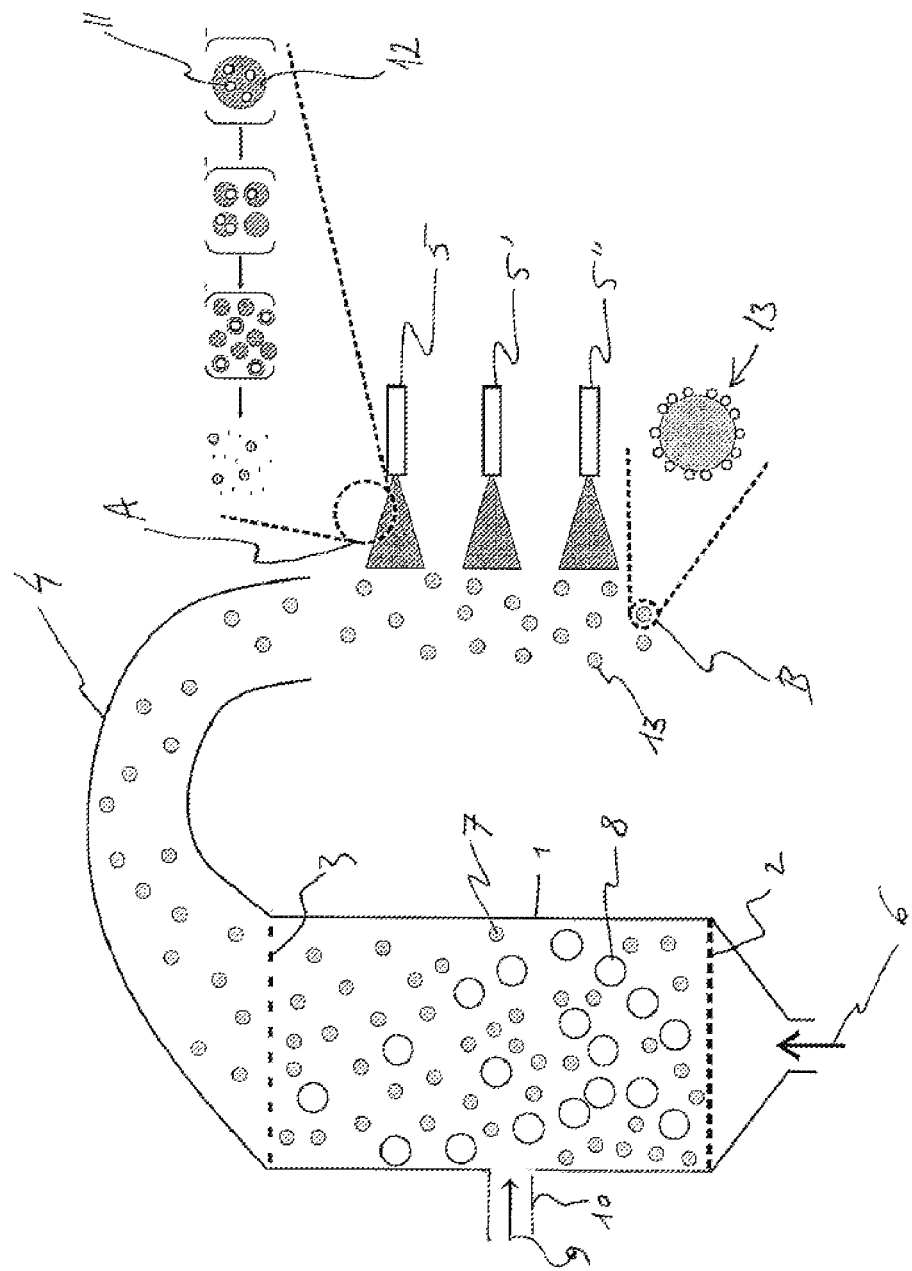

| DE | 102005020561 A1 | 11/2006 |
| WO | WO9856894 A1 | 12/1998 |

OTHER PUBLICATIONS

Dabkowski et al., "The Coating of Particles with Nanoparticles by Means of Electrostatic Forces", Delft University of Technology, Delft, Netherlands and University of Florida, Gainesville, Florida, USA, PARTEC 2007, pp. 1-4.*

Sharmene et al., "Minority Charge Separation in Falling Particles with Bipolar Charge", University of Western Ontario, London, Ontario, Canada, Journal of Electrostatics, vol. 45, 1998, pp. 139-155.*

Hoffmann, "Fluidization with Baffles", Stratingh Institute for Chemistry and Chemical Engineering, Jun. 19, 2007.*

PCT/NL2010/050155 International Search Report and Written Opinion, 7 pages, Jul. 23, 2010.

PCT/NL2010/050155 International Preliminary Report on Patentability, 8 pages, Jul. 13, 2011.

* cited by examiner

PROCESS AND APPARATUS FOR PRODUCING COATED PARTICLES

CROSS REFERENCE TO RELATED APPLICATIONS

This application is a U.S. National Phase Application under 35 U.S.C. §371 of International Application PCT/NL2010/050155, filed on Mar. 25, 2010, which claims the benefit of Netherlands Application No. 2002666, filed on Mar. 25, 2009, the entire contents of which are hereby incorporated by reference in their entireties.

The invention is directed to a process and apparatus for preparing coated particles, in particular a process for preparing particles that are coated with small particles, which are dispersed using electrospraying. The coated particles produced according to the present invention find use for instance as catalysts or as pharmaceuticals.

In the art, composite particles comprising a host particle on the surface of which are adhered smaller guest particles are commonly produced by contacting the host particles in the liquid phase with guest particles. By relying on chemical and/or physical interaction between the host and guest particles, the latter are bonded to the former. For instance catalysts comprising a carrier and an active material are commonly produced in this way.

In this way host particles coated with guest particles can be obtained, however in practice using liquid based dispersions easily results in contamination of the dispersion and thus of the particles (host and/or guest particles). This is because liquids tend to absorb impurities from the surroundings. For certain applications, such as for pharmaceutical applications, this is not acceptable. Also the use of dispersions based on liquids requires that the liquid is evaporated at some stage. This results in high costs for either means to capture and recirculate the evaporated liquid or in replenishing the evaporated liquid. Also current processes are usually batch processes, amongst others because it is difficult to control suspension concentration in liquid based systems.

Dabkowski et al. (Partec 2007—CD proceedings, pp. 1-4, Nuernberg Messe GmbH) describe a process for coating micron-size particles ("host particles") with nano-sized polystyrene particles ("guest particles") using an electrospraying technique. In this process alumina particles are first charged by a phenomenon referred to as tribocharging. Tribocharging is based on the triboelectric effect. Due to this effect materials become electrically charged after they are contacted with a different material and subsequently separated. Thus, tribocharging is based on charging a body by surface contacts, such as rubbing, with a second body of a different kind of material. The charging mechanism is believed to be based on the transfer of electrons according to the work function model. The work function is defined as the minimum energy required to transfer the weakest bound electron from a body to infinity. The effectiveness of this transfer depends on the difference in work function between the two chosen materials. Dabkowski et al. concluded that Teflon™ (PTFE) was the most effective material for charging alumina powder. PTFE charges alumina with a net positive polarity.

According to the process of Dabkowski et al. the charged alumina particles are transported over a conveyor belt and pass an electrospraying area. In the electrospraying area the host particles are exposed to a spray of negatively charged guest particles, which spray is obtained by electrospraying a dispersion in mainly ethanol of said guest particles.

As a result, the negatively charged guest particles are attracted to the positively charged host particles and adhere thereto.

In practice, the use of a conveyor belt in this known process results in inefficient charging and coating of the host particles. Moreover, it is difficult to scale up this known process based on the electrospraying of liquid based dispersion.

Figure 2:
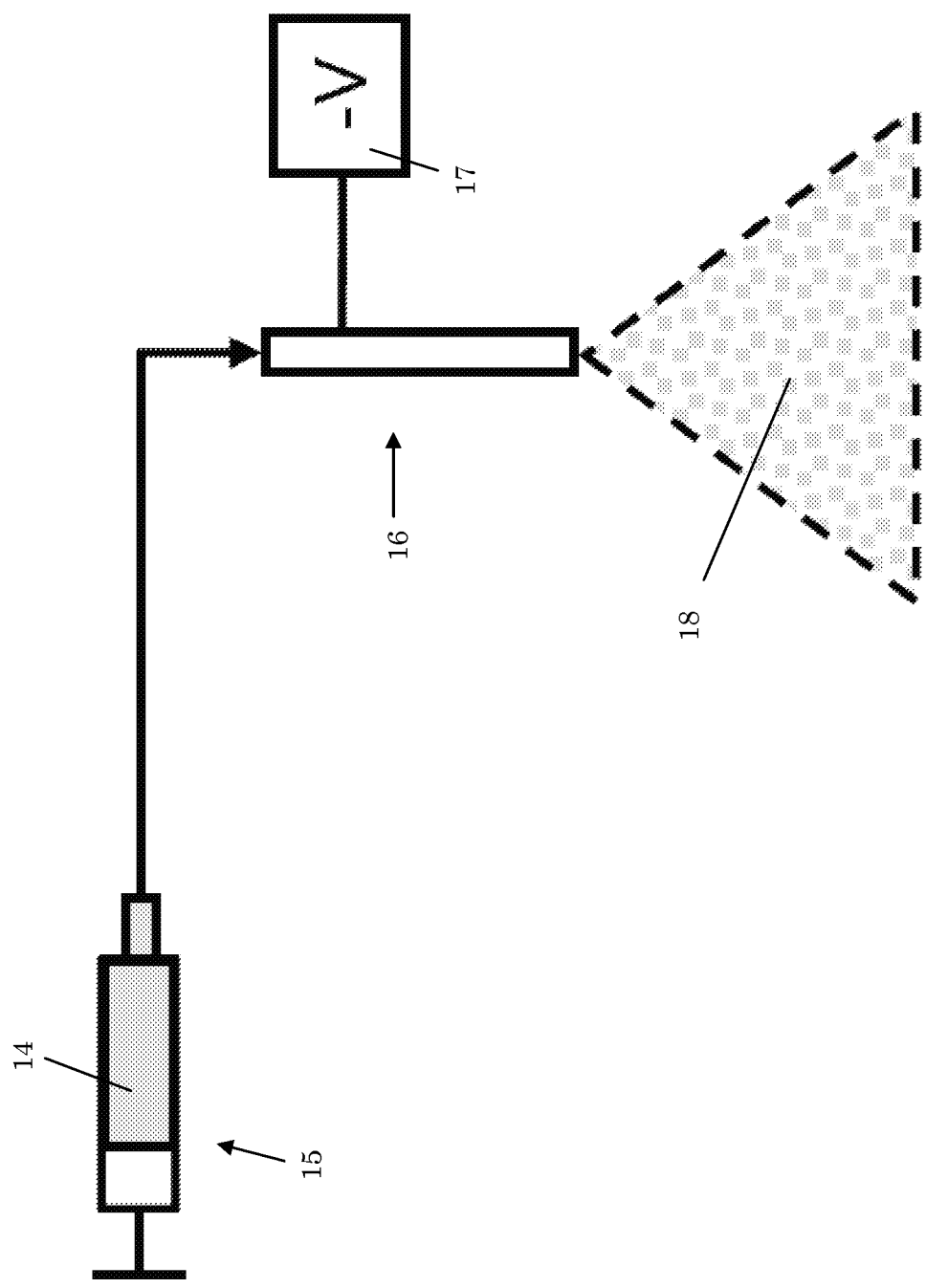

It is an object of the present invention to provide a process which is at least in part improved with respect to the above-mentioned drawbacks. The present inventors found that this object can be met by charging the host particles prior to the electrospraying step by contacting them in a gas stream with a different material, by which the host particles are charged. Thus, in a first aspect, the present invention is directed to a process for producing a composite particle comprising a host particle having adhered to its surface one or more smaller guest particles, which process comprises the subsequent steps of:

bringing said host particle in a gas stream and allowing it to contact with one or more moving tribocharging particles, thus providing a charged host particle;

separating said charged host particle from said tribocharging particles; and subjecting said charged host particle to an electrospraying step, in which said guest particles are provided with a charge that is opposite to the charge of said charged host particles, followed by contacting said guest particles with said host particles, whereby said guest particles adhere to said host particle, thus forming said composite particle.

Surprisingly it was found that by this method a very efficient way of coating host particles with guest particles is obtained. The guest particles and the host particles are attracted to each other as a result of their opposite charge. The guest particles move to the surface of the host particle where they bond. The bonding between the host and the guest particles is excellent. Although initially this bonding depends on the difference in electrostatic charge between the two types of particles, it was found that even if the charge differences were allowed to equilibrate the bonding was still very high. Without wishing to be bound by theory, it is believed that the final bonding of the particles is based on Van der Waals forces.

As used herein, electrospraying refers to a process wherein a liquid jet breaks up under influence of electrical forces. To this end, the liquid is pumped through a nozzle with a relatively low flow rate. An electric field is applied over the liquid by applying a potential difference between the nozzle and a counter electrode. When the electric stresses overcome the surface tension stresses, the emerging meniscus from the tip of the nozzle is transformed into a conical shape. From the cone apex a jet emerges which breaks up into droplets, which are generally considered to be—monodisperse or approximately monodisperse. This spraying mode is referred to as the cone-jet mode. Because the droplets have the same polarity (unipolarity) coagulation is prevented and dispersion is enhanced. The size of the droplets is typically in the order of nanometers to several microns.

Suitable configurations for the electrospraying step in accordance with the present invention are for instance those described by Dabkoswki et al. and the references cited therein.

BRIEF DESCRIPTION OF THE DRAWINGS

FIG. 1 shows schematically an apparatus for carrying out the present invention.

FIG. 2 is a schematic overview of an electrocharging device that could be used in accordance with the present invention.

FIG. 1 shows schematically an apparatus for carrying out the present invention. The apparatus of FIG. 1 comprises a fluidized bed contactor (1), which typically is a container having a hollow cylindrical shape. Fluidized bed contactor (1) is fitted with a first sieve plate (2) and an optional second sieve plate (3). Fluidized bed contactor (1) is connected at its top end to channel (4), from which the particles are allowed to enter the electrospraying zone, which is equipped with one or more electrospraying devices (three are depicted here, numbered 5, 5' and 5").

The setup is operated by feeding gas stream (6) to the bottom of fluidized bed contactor (1). The gas stream passes through sieve plate (2) and transfers momentum to host particles (7) and tribocharing particles (8), which by result will move. Thus the host particles are subjected to multi-point interactions with the tribocharging particles, which provides a uniform charge distribution among the particles, in particular when compared to direct contact charging of conventional methods. Optionally fresh host particles (9) can be fed, continually or in a batch-wise fashion, through feed opening (10).

The charged host particles (7) leave the contactor (1) at the top. Optional sieve plate (3) can be used to stop tribocharging particles (8) if they have a size that is too similar to the size of the host particles (7). If the tribocharging particles are sufficiently larger than the host particles, sieve plate (3) may be omitted, since the separation will take place due to difference in buoyancy.

The charged host particles are then conveyed through channel (4), which is optionally provided with a charge that is the same as that of the charged host particles, so that they are repelled from the inner surface of channel (4).

Next, the host particles enter the electrospraying zone. The transport from contactor (1) to the electrospraying zone takes place by entrainment of the host particles with the gas flow. In the electrospraying zone, electrospraying device (5) sprays a suspension of guest particles (11) in a liquid (12). The magnification at (A) shows that during their movement from the nozzle of electrospraying device (5) into the stream of host particles, the liquid evaporates, leaving a flow of negatively charged guest particles. The guest particles impact with the host particles and adhere thereto, to form composite particles (13), which comprises host particles having adhered thereto the guest particles, as is illustrated by magnification (B). As an alternative to spraying a suspension of guest particles into the electrospraying zone, the (suspension of) guest particles may be formed inside the electrospraying zone. This can for instance be accomplished by spraying a solution of a precursor material for the guest particles in a liquid (12), from which precursor material the guest particles are formed upon evaporation of the liquid. Such embodiment is in principle suitable for any precursor material that solidifies (precipitates) after the liquid has evaporated in the electrospraying device to the extent that saturation concentration in the liquid has been reached. Thus, it is for example possible to spray a protein solution into the electrospraying zone, wherein the protein solution forms (a suspension of) guest particles.

Multiple electrospraying devices can be used in series, as schematically indicated in FIG. 1. In a preferred embodiment, the different electrospraying devices produce particles of opposite charges. For instance electrospraying device (5) may produce guest particles (11) having a negative charge. When positively charged host particles (7) are contacted with these negative guest particles (11) this may result, after a sufficient amount of guest particles (11) have adhered to the host particles (7), in a composite particle that has become neutral or even negatively charged, depending on the contact time. It would then be difficult to load such composite particles further if a stream of negatively charged guest particles was to be used. Therefore it would be advantageous to produce a stream of positively charged particles by electrocharging device (5'). Next, after the composite particles (13) thus produced, which would be after sufficient contact time be again neutral or positively charged, a further electrospraying device (5") could be used to spray negatively charged particles again, et cetera.

In FIG. 2 a schematic overview is shown of an electrocharging device that could be used in accordance with the present invention. FIG. 2 shows a suspension (14) of small guest particles ("nanoparticles") being pumped, e.g. using a peristaltic pump (15), such as a membrane pump or a syringe pump, to a narrow orifice (16), e.g. a hollow needle, to which a voltage (17) is applied (in FIG. 1 a negative voltage is used). As a result an electrospray (18) is formed. Of course, in this embodiment too, the guest particles may be formed after forming the electrospray, see above.

Typical inner diameters of the orifice are from 0.1 to 1 mm, preferably 0.25-0.75 mm. The length of the orifice (needle) is such that a stabilized flow pattern is obtained, which means that it is usually more than hundred times its inner diameter.

Typical flow rates of the suspension are 0.1-10 ml/h per spraying unit, preferably 0.2-1 ml/h.

Typical concentrations for the suspensions depend on the type of particles and the type of liquid in which they are suspended. It is preferred that the suspension is stable. Typically the concentration is in the range of 0.01-1% by volume, preferably from 0.02-0.1% by volume.

In accordance with the present invention, suspensions of solid guest particles or solutions of a material that forms solid guest particles after evaporation of a sufficient part of the liquid in which the material has been dissolved are used as the liquid to be dispersed. Electrospraying such a suspension or solution generates a spray of charged droplets that contain the particles or the material that forms the particles when the spray is evaporated. The utilization of a volatile liquid leads to fast evaporation. Suitable liquids for providing the dispersion are for instances ethanol, acetone, water, or mixtures thereof, but this depends also on the type of host and guest particles used. Suitable liquids must allow electrospraying and should be compatible with material of the guest particles. Mixtures of ethanol and water are particularly suitable for most cases. As a result of the evaporation the droplets shrink and at a critical diameter they will break up into smaller droplets. Breaking up occurs at the so called Rayleigh charge limit, which is reached when the mutual repulsion of electric charges at the surface exceeds the confining force of surface tension. This process repeats itself until droplets are formed which contain 0, 1, 2 or more particles depending on the initial particle concentration in the suspension. It is not essential to have all liquid evaporated before the guest particles contact the host particles, but it is preferred. Total evaporation of the liquid phase results in a charged spray of single or agglomerated particles.

Typical voltages that are applied in the electrospraying step are in the order of several kV, for instance from 1 to 10 kV, either positive or negative.

In a preferred embodiment the host particle are contacted with the guest particles in two or more electrospraying steps. More preferably this comprises electrospraying steps wherein the guest particles are given opposite charges. Multiple electrospraying steps are particularly useful in case of inefficient charging of the host particles, in particular multiple electrospraying steps with alternating polarities. Thus build up of more charged quest particles are achieved, viz. initially positively charged host particles attracts negatively charged guest particles. As mentioned hereinabove, if the deposition of guest particles of a certain polarity is continued for a period that is too long, deposition may eventually stop since the net charge may first become zero (neutral particle) and eventually may turn to an opposite value. To improve the deposition an electrospray providing positively charged guest particles is required on the path of the host particle. This can be repeated until a desired coating is realized.

In another embodiment, the alternating sprays contain different types of particles. This allows the formation of composite structures, viz. host particles being covered with different types of guest particles.

The host particle used in accordance with the present invention can be any suitable carrier material, depending on its application. For instance, composite catalyst can be made by providing a host particle of alumina, silica, zirconia, another carrier material, or the like.

For pharmaceutical applications, the host particle can be based on a material that can be absorbed in the body, e.g. a lactose carrier for application in inhalers, wherein the pharmaceutically active compound is the guest particles. Suitable pharmaceuticals are for instance corticosteroids (e.g. ciclesonide/Alvesco™, or triamcinolone-acetonide/Azmacort™) for asthma patients, or anti inflammatory drugs for COPD (Chronic Obstructive Pulmonary Disease).

In the case of asthma, two types of active medications are used: ones for treatment of acute syndromes and ones for long term control. The former involves the use of selective beta(2) adrenergic receptor antagonists. and the second involves the use of anti-inflammatory drugs such as anti-allergics and/or corticosteroids. Further examples of active ingredients used in dry powder inhalers can for instance be found in Smyth and Hickey (American Journal of Drug Delivery 3 (2005)117-132) and include compounds such as albuterol (salbutamol); beclomethasone dipropionate (BDP); budesonide; eformoterol; fluticasone; ipratropium; salmeterol; sodium cromoglycate; and terbutaline. Useful compound or combinations of these compounds are ipratropium; eformoterol; albuterol (salbutamol) and beclomethasone dipropionate (BDP); albuterol, ipratropium, BDP and budesonide; albuterol, salmeterol, BDP and fluticasone; albuterol, salmeterol, fluticasone, salmeterol and fluticasone; albuterol and BDP; albuterol, BDP, albuterol and BDP; sodium cromoglycate; and albuterol, terbutaline, eformoterol, budesonide, eformoterol and budesonide.

Further, the guest particles may comprise a biologically active polymer, such as a polypeptide.

Other possible applications comprise coating particles with so called flowability enhancers or nanoparticles of the same material as the host particles. Some of these flowability enhancers are sometimes referred to as "spacers". These spacers can be visualized as small ball bearings, creating a rougher surface and minimizing direct contact between two host particles, which also leads to a decrease in van der Waals forces.

The step of bringing the host particles in the gas stream and allowing them to contact with moving tribocharging particles is preferably carried out in a fluidized bed. A typical set up is depicted in FIG. 2. In this figure gas is injected at the bottom of the contactor and suspends both the tribocharching particles as the host particles. The gas flow and other process parameters, in particular dimensions of the equipment are chosen such that the host particles leave the contactor with the desired charge. Subsequently they are fed through a channel, which is preferably charged oppositely to the host particles charge to avoid contact with the channel wall, to the electrospraying step. This minimizes wall deposition of the host particles.

As guest particles in principle any solid that can be brought in the form of a finely divided powder can be used. Preferably the guest particles are nano-particles. As used herein, "nano-particles" are particles having an average diameter in the order of about 1 to several hundreds of nanometers, in particular of 1 to 100 nm.

The function of the gas stream is to suspend the host particles, if this is necessary and to bring about the contact between the tribocharging particles and the host particles. As explained hereinabove, the movement of the tribocharging particles results in charge transfer to the host particles, so that a charged host particle is obtained. The average diameter of the host particles usually is in the range of 1 μm to 1 mm. The host particles preferably have an average diameter that is in the range of 1-200 μm, more preferably from 5-100 μm. In particular, if the host particles are to be suspended by the gas stream, it is preferred that they have an average diameter at least several μm up to 1 mm, preferably of 5-100 μm, in particular of 10-100 μm.

The gas can be for instance air, or nitrogen. Preferably the humidity of the gas is controlled dried before it is applied in the process of the present invention. If the humidity is too low, it may be difficult to fluidize the particles, because static electricity can build up, resulting in the particles sticking to the inner surface of the fluidized bed contactor. If the humidity is too high, it may not be possible to charge the particles sufficiently.

Suitable materials for the tribocharging particles are for instance, brass, aluminum, polyvinylchloride (PVC), stainless steel or PTFE. The choice of a suitable material depends mainly on the properties of host particles. Difference in work functions can be used as a first criteria and the selection can be optimized based on the process requirements.

The average diameter of the tribocharging particles is preferably such that they can be easily separated from the host particles, while providing at the same time sufficient area to enable efficient charge transfer. This means that the tribocharging particles are preferably larger than the host particles, more preferably having an average diameter that is about 3 to 5 times higher than that of the host particles. Typically the average diameter of the tribocharging particles is from 50 μm to 1 mm, preferably from 100 μm to 0.5 mm).

After the host particles are charged, they can be separated from the tribocharging particles. This can be done in a number of ways. It is preferred to the do this by applying a sieve in the gas flow, which sieves the tribocharging particles and allows the charged host particles to pass. This is particularly preferred if a fluidized bed is used for contacting the host and tribocharging particles. However, the separation can for instance also be carried out based on their difference in entrainment with the fluidized bed gas exit stream. It is for instance also possible to use a filter or separation device, such as a cyclone.

The invention claimed is:

1. A process for producing a composite particle comprising a host particle having adhered to its surface one or more smaller guest particles, which process comprises the steps of:
   (i) bringing said host particle in a gas stream and allowing it to contact with one or more moving tribocharging particles, thus providing a charged host particle;
   (ii) separating said charged host particle from said tribocharging particles; and (iii) subjecting said charged host particle to an electrospraying step, in which said guest particles are provided with a charge that is opposite to the charge of said charged host particle, followed by contacting said guest particles with said host particle, whereby said guest particles adhere to said host particle, thus forming said composite particle, wherein step (i) is carried out in a fluidized bed wherein said host particle is suspended, wherein said gas stream is fed to the bottom of said fluidized bed, and wherein said tribocharging particles are moved by the flow of said gas, and wherein the charged host particle is fed from the fluidized bed to an electrospraying zone in a gas flow through a channel.

2. The process according to claim 1, wherein step (ii) is carried out by applying a sieve in the gas flow, which sieve allows said host particle to pass and which stops said tribocharging particles.

3. The process according to claim 1, wherein step (iii) comprises subjecting the host particle to two or more electrospraying steps.

4. The process according to claim 3, wherein, in said two or more electrospraving steps, electrosprays having opposite charges are used.

5. The process according to claim 1, wherein a plurality of said host particles are coated.

6. The process according to claim 1, which is carried out continuously.

7. The process according to claim 1, wherein said composite particle is produced by an apparatus comprising said fluidized bed, which comprises a first sieve plate and optionally a second sieve plate, wherein said fluidized bed is connected at its top end to said channel, wherein said channel ends in said electrospraying zone, which is equipped with one or more electrospraying devices, wherein the fluidized bed further comprise a first feed entrance for feeding gas and optionally a second feed entrance for feeding said host particle.

* * * * *